United States Patent Office 3,271,258
Patented Sept. 6, 1966

3,271,258
MELAMINE AND DICYANDIAMIDE AS DEPILATORY ACCELERATORS
Charles Zviak, Franconville, and Jean Rouet, Le Blanc-Mesnil, France, assignors to Société Anonyme dite: L'Oreal, a corporation of France
No Drawing. Filed June 19, 1963, Ser. No. 288,908
Claims priority, application France, June 22, 1962, 901,682
8 Claims. (Cl. 167—89)

This invention relates to depilatory compositions.

Depilatory compounds based on thiol acids and particularly based on thioglycolic acid and thiolactic acid have been described. In particular, there have been used for this purpose the alkaline-earth salts and particularly the calcium salts and the strontium salts of these two acids. Such compositions do not liberate a disagreeable odor, and in that respect have an advantage over other known depilatory compositions which are based on sulphide, and especially strontium sulphide. However, depilatory compositions based on thiol acids have the disadvantage, by comparison with the depilatory compositions having a sulphide base, of requiring a much longer application time.

In order to obviate this latter disadvantage, it has already been proposed to add to the thiol acid salts (particularly to strontium thiolactate) substances such as urea, itself known to have depilatory action, and to produce swelling of the keratin.

Compositions containing both thiol acids and urea afford an increased speed of depilatory action but are less stable than is desired, especially since urea tends to decompose in alkaline media at pH 12 or above.

It is an object of the present invention to provide depilatory compositions which have good keeping qualities, which are rapid in action and which are innocuous to the user. The compositions according to the present invention may be used at ordinary room temperatures.

According to the present invention there is provided a depilatory composition which comprises, in admixture, one or more thiol acids (e.g. thiolactic acid or thioglycolic acid) or their alkaline-earth metal salts and, as accelerator for the action thereof, an alkali metal or alkaline-earth metal melamine or dicyandiamide, or a mixture of any of these compounds.

In a preferred form of the invention, the depilatory composition comprises 0.5 to 2.0 parts by weight of a said accelerator per part of thiol acid or salt thereof present in the composition.

The dicyandiamide referred to have been described as swelling agent for keratin but have not hitherto been known to possess a keratolytic action. Melamine has hitherto not been proposed either as a swelling agent for hair or as a keratolytic agent.

The depilatory compositions of the invention may, if desired, also contain other accelerating agents known per se for the purpose, e.g. urea or thiourea.

The following examples will serve to illustrate the invention:

Example 1

A depilatory paste is obtained by mixing with 3 to 4 times its weight of water a powder having the following composition:

|  | G. |
|---|---|
| Calcium thioglycolate | 7 |
| Kaolin | 20 |
| Melamine | 7 |
| Lime | 2 |

A satisfactory depilation is obtained by means of this product in a few minutes without release of any appreciable odor. The product is stable on keeping.

Example 2

A depilatory paste is obtained by mixing:

|  | G. |
|---|---|
| Strontium thiolactate | 9 |
| Cetyl alcohol oxyethylenated with 5 mols of ethylene oxide | 4 |
| Calcium carbonate | 25 |
| Lime sufficient to bring the mixture to pH 12.5. |  |
| Melamine | 5 |
| Water to make 100 g. |  |

The product thus obtained has excellent stability and enables a good depilation to be obtained in a few minutes.

Example 3

A depilatory obtained by mixing:

|  | G. |
|---|---|
| Calcium thioglycolate | 7 |
| Kaolin | 12 |
| Lauric alcohol sulphate, sodium salt | 4 |
| Lime sufficient to bring the mixture to pH 12. |  |
| Dicyandiamide | 4 |
| Water to make 100 g. |  |

A satisfactory depilation is obtained with this product in a few minutes.

Example 4

A depilatory is obtained by mixing:

|  | G. |
|---|---|
| Calcium thioglycolate | 6 |
| Kaolin | 12 |
| Methylcellulose | 3 |
| Lime sufficient to bring the mixture to pH 12.3. |  |
| Dicyandiamide | 3 |
| Thiourea | 3 |
| Water to make 100 g. |  |

An excellent depilatory is obtained in this way, having good stability.

Example 5

A depilatory according to the invention is obtained by mixing:

|  | G. |
|---|---|
| Strontium thiolactate | 9 |
| Cetyl alcohol oxyethylenated with 5 mols of ethylene oxide | 4 |
| Calcium carbonate | 25 |
| Lime sufficient to bring the mixture to pH 12.3. |  |
| Melamine | 3 |
| Dicyandiamide | 2 |
| Water to make 100 g. |  |

The depilatory thus obtained ensures good depilation in a few minutes.

Other thiol acids than those mentioned in the foregoing examples and other alkaline-earth metal salts of these acids may be employed to afford similar results. The content of melamine or dicyandiamide may be varied widely, though the best results are generally obtained when using the general proportions indicated.

What is claimed is:

1. A depilatory composition comprising:
    (a) one part of at least one substance selected from the group consisting of thioglycolic acid, calcium thioglycolate, strontium thioglycolate, thiolactic acid, calcium thiolactate and strontium thiolactate, and
    (b) one-half to two parts of an accelerator comprising at least one substance selected from the group consisting of melamine and dicyandiamide,
    (c) said composition having a pH of substantially 12 when mixed with water.

2. A depilatory composition as claimed in claim 1 to which is added urea.

3. A depilatory composition as claimed in claim 1 to which is added thiourea.

4. A depilatory composition comprising one part of calcium thioglycolate and one-half to two parts of melamine having a pH of substantially 12 when mixed with water.

5. A depilatory composition comprising one part of calcium thiolactate and one-half to two parts of melamine having a pH of substantially 12 when mixed with water.

6. A depilatory composition comprising one part of calcium thioglycolate and one-half to two parts of dicayandiamide having a pH of substantially 12 when mixed with water.

7. A depilatory composition comprising one part of strontium thioglycolate and one-half to two parts of dicyandiamide, and thiourea, having a pH of substantially 12 when mixed with water.

8. A depilatory composition comprising one part of strontium thiolactate, and one-half to two parts of a mixture of melamine and dicyandiamide having a pH of substantially 12 when mixed with water.

References Cited by the Examiner

UNITED STATES PATENTS 2,836,185  5/1958  Hervey _____ 167—87.1

FOREIGN PATENTS 1,161,048  6/1960  France.
484,467    4/1938  Great Britain.
75,320     7/1954  Netherlands.

OTHER REFERENCES

Hilfer I, Drug and Cosmetic Industry, 64 (2); pp. 164–165, February 1949.

Hilfer II, Drug and Cosmetic Industry, 70 (1); p. 48, July 1956.

Sagarin I, Cosmetics, Science and Technology, Interscience Publishers, New York, N.Y. (1957), pp. 446–467.

Sagarin II, supra, pp. 468–472.

JULIAN S. LEVITT, *Primary Examiner.*

FRANK CACCIAPAGLIA, JR., *Examiner.*

VERA C. CLARKE, *Assistant Examiner.*